June 24, 1947.  H. T. KRAFT  2,422,788
RETREAD VULCANIZING DEVICE
Filed Jan. 24, 1945  2 Sheets-Sheet 1
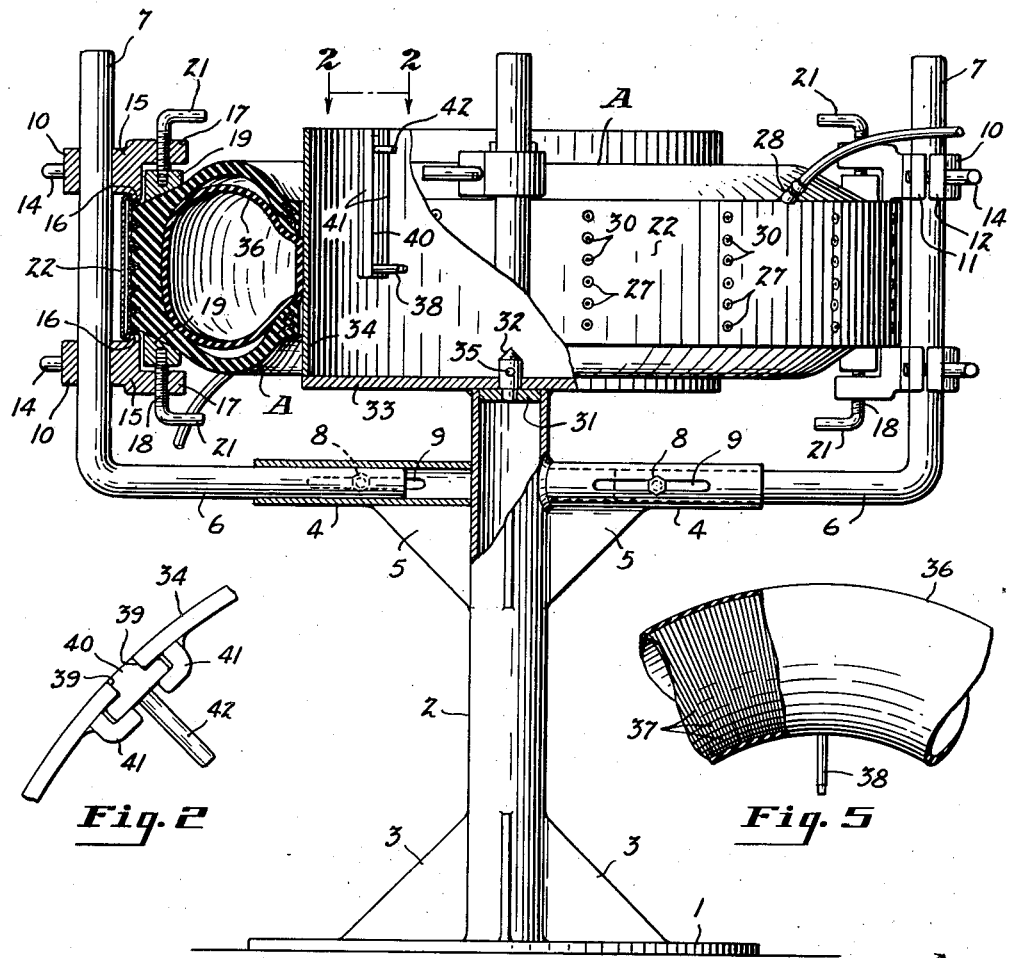
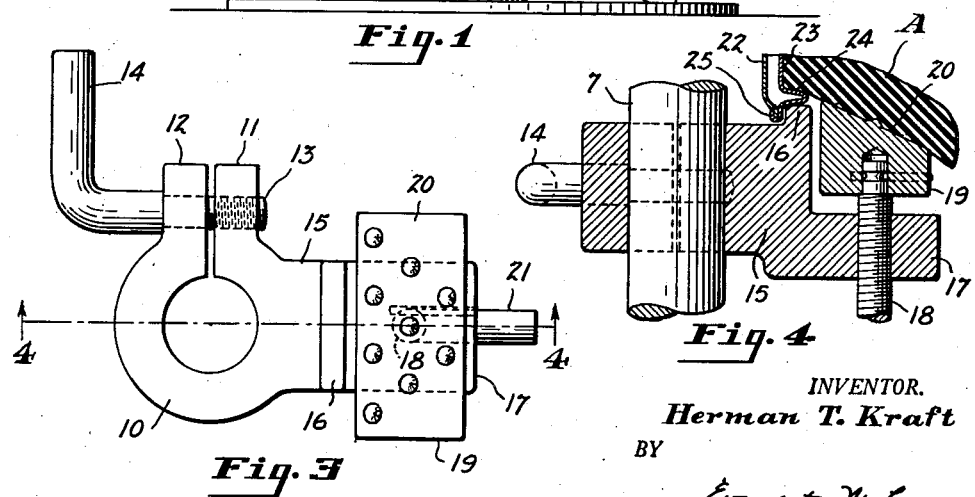
INVENTOR.
Herman T. Kraft
BY
Evans & McCoy
ATTORNEYS

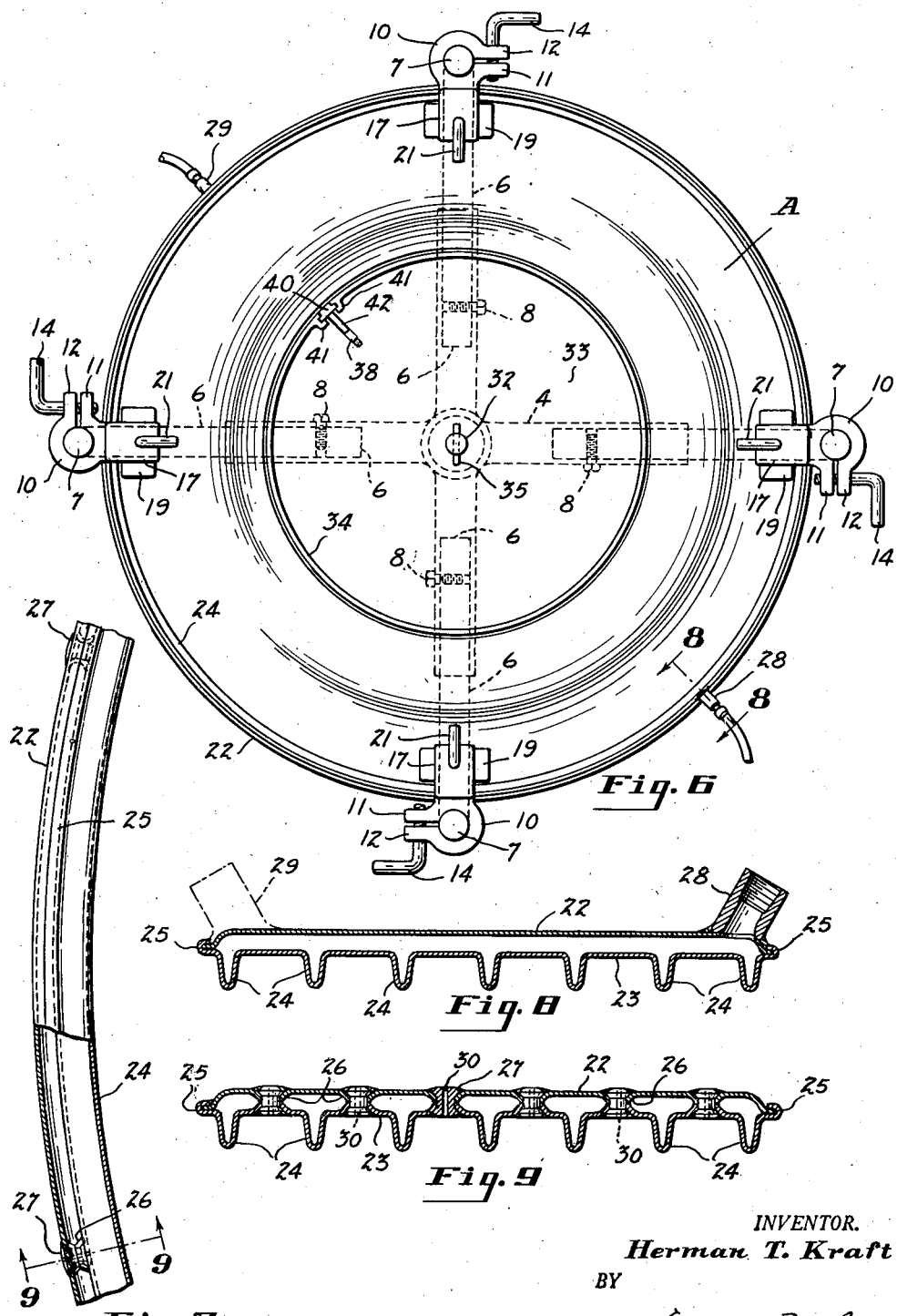

Patented June 24, 1947

2,422,788

UNITED STATES PATENT OFFICE 2,422,788

RETREAD VULCANIZING DEVICE

Herman T. Kraft, Akron, Ohio, assignor to The General Tire & Rubber Company, Akron, Ohio, a corporation of Ohio Application January 24, 1945, Serial No. 574,230

11 Claims. (Cl. 18—18)

This invention relates to apparatus for vulcanizing retreads on pneumatic tire casings and particularly to apparatus employing relatively light sheet metal molds that engage the tread portion of the tire only.

One of the main objects of the invention is to provide a single, simple, convenient and inexpensive mold supporting stand that is adjustable to accommodate motor vehicle tires of any of the sizes commonly used.

A further object of the invention is to provide an improved means for supporting the mold and tire casing and for applying radial outward pressure to the tread portion of the tire casing.

An additional object is to provide a quickly and easily detachable closure member for the opening of the tire casing which will serve to retain a radially expansible core within a tire casing.

It is also an object of the invention to provide an efficient and convenient means of utilizing fluid pressure to press the tire tread radially outwardly into the tread mold.

With the above and other objects in view, the invention may be said to comprise the retread vulcanizing apparatus as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Fig. 1 is a side elevation of a retread mold and its support, the mold and mold support being broken away at one side and shown in section;

Fig. 2 is a section taken on the line indicated at 2—2 in Fig. 1;

Fig. 3 is a top plan view of one of the mold supporting and positioning members;

Fig. 4 is a section taken on the line indicated at 4—4 in Fig. 3;

Fig. 5 is a fragmentary perspective view showing the structure of the inflatable core;

Fig. 6 is a top plan view of a mold and its support;

Fig. 7 is a fragmentary side elevation of a tread mold with a portion broken away and shown in section;

Fig. 8 is a transverse section through the mold taken on the line indicated at 8—8 in Fig. 6, and Fig. 9 is a section taken on the line indicated at 9—9 in Fig. 7.

As illustrated in the accompanying drawings, the mold support of the present invention is in the form of a pedestal having a base 1 and a column 2 suitably united to the base and braced by suitably triangular webs 3. The column 2 which may be of tubular form, has rigid radially extending tubular arms 4 suitably joined thereto, each of the arms 4 being braced by a triangular web 5. The radial arms 4 are horizontal and regularly spaced about the axis of the column 2 and each arm receives a supporting member 6 which has a sliding fit in the tubular arm, each member 6 having an upright outer end portion 7. Each of the members 6 carries a laterally extending screw 8 that extends through a slot 9 in one side of the arm 4 in which it fits. By means of the screws 8 the members 6 can be secured in different positions of radial adjustment.

Each of the uprights 7 carries two identical mold positioning members 10, each of which is in the form of a split collar having a sliding fit on the upright 7. Each of the members 10 has laterally projecting flanges 11 and 12 spaced apart at the split that are adapted to receive a screw 13 for tightening the member on the upright 7 to secure it in adjusted position. The screw 13 is threaded in the flange 11, is provided with a shoulder engaging the flange 12 and has a handle portion 14 by means of which it may be turned to cause the member 10 to grip the upright 7.

Each of the members 10 has a laterally projecting portion 15 provided with a vertical positioning flange 16 and a horizontal projecting flange 17. The flange 17 carries a screw 18 which has its inner end swiveled to a clamping block 19 that has an inner tapered and serrated tire engaging face 20. The outer end of each screw 18 is provided with a handle 21 by means of which it may be turned to adjust the clamping block 19.

As shown in Fig. 1 the two mold positioning members on each of the uprights 7 are oppositely arranged, the lower of the two members being disposed with its positioning flange 16 projecting upwardly and its clamping block 19 above its supporting flange 17, and the upper of the two members being disposed with its positioning flange 16 projecting downwardly and its clamping block 19 beneath its supporting flange 17. The positioning members engage the top and bottom edges of an annular retread mold 22 which is preferably formed of a hollow sheet metal ring having an inner wall 23 in which hollow, inwardly projecting ribs 24 have been formed. The inner and outer walls of the mold 22 may be joined by edge seams 25 which project beyond the outermost ribs of the mold to provide seating shoulders for engagement with the positioning flanges 16.

In mounting the mold and tire casing upon the support, a tire casing A with the retread to be vulcanized in place thereon is positioned within the vulcanizing mold 22. The diameter of the mold is preferably somewhat less than the normal external diameter of the tire casing and the tread of the tire casing, which is shrunk in placing it within the mold, exerts an expansive thrust against the interior of the mold.

In placing the mold and tire casing in the support, the upper positioning members 10 are removed from the uprights 7 and the tire casing A with the mold 22 thereon is lowered into place on the lower positioning member 10 with the edge flange or seam 25 positioned outside the flanges 16 and the lowermost rib 24 engaging the top of the flanges 16. The mold is thus positioned concentrically with respect to the support and held against radial displacement. After the tire and mold is in place, the upper positioning members 10 are placed on the upright 7 with their flanges 16 engaging the mold inwardly of the edge flange 25 so as to securely clamp the mold in proper position. The tire clamping blocks 19 are then adjusted into clamping engagement with opposite sides of the tread portion of the tire casing by means of the screws 18 so as to securely hold the tire casing against relative axial movements with respect to the mold 22.

The inner and outer walls of the mold 22 have portions 26 at spaced points throughout the periphery of the mold pressed inwardly into contact to provide internal braces stiffening the sheet metal walls. The walls are rigidly secured together and further stiffened by means of rivets 27 which extend through the pressed in portions 26. The mold is provided with a suitable steam inlet 28 and a suitable drain outlet 29 so that steam may be circulated through the mold to apply the desired amount of heat to the retread being vulcanized. In order to permit the escape of gases from the tread material being vulcanized, vents 30 may be formed through certain of the rivets 27.

The upper end of the column 2 is provided with a closure member 31 which carries an upwardly projecting positioning pin 32 that is adapted to pass through a central aperture in a base member 33 which carries a cylinder 34 of a size to approximately fit within a central opening in the tire casing being vulcanized. The base member 33 may be held in place by means of a suitable locking pin 35 passing transversely through the pin 32.

The cylinder 34 serves as a confining member for an inflatable core bag 36 that is mounted within the tire casing for applying radial outward pressure to the tread of the casing. The core bag 36 is so constructed that it is expansible radially but not laterally, so that when inflated pressure is exerted radially outwardly against the interior of the tire tread, but no pressure is exerted laterally upon the side walls of the tire casing.

As shown in Fig. 5 the core bag 36 is formed of rubber reinforced by transversely extending cords 37 that are wound around the core at substantially right angles to the external circumference thereof. Such transversely wound cords permit radial expansion of the core, but prevent the expansion of the core to a greater transverse diameter when it is inflated. The core bag 36 therefore, when inflated exerts nearly all of its pressure outwardly upon the tread portion of the tire casing and is prevented from expanding radially inwardly by the cylindrical member 34 which covers the interior opening of the tire casing.

Since the core bag expands only in a radial direction, it exerts no lateral pressure on the side walls or beads of the tire casing. It is, therefore, unnecessary to confine the side walls and bead portions of the tire casing, and the cylindrical member 34 need not have a close fit within the opening of the tire casing since all that is required of this member is to prevent inward expansion of the core bag through the opening of the tire casing.

The core bag 36 has a stem 38 through which fluid under pressure is introduced into the bag, and the cylinder 34 is provided with a vertical slot 39 to receive the stem 38, the slot 39 extending downwardly from the top edge of the member 34. A cover 40 for the slot 39 is mounted to slide between angle guide members 41 attached to the inner face of the cylinder 34 on opposite sides of the slot and is provided with a handle 42 by means of which it may be lifted up out of engagement with the guides to permit upward movement of the valve stem 38 when the tire is being removed from the support. The cover member 40 serves to close the slot above the stem 38 while the core bag 36 is inflated.

It will be apparent that the device of the present invention provides a simple and inexpensive mold support which can be readily adjusted to receive tires and molds of various sizes so that the expense of equipping a retreading shop is greatly reduced. In addition to the mold support, it is necessary for the retreader to keep in stock only a set of the mold rings 22 for the various sizes of tires to be retreaded, a sufficient number of cylinders 34 to fit within the different sizes of the tires, and inflatable cores 36 for the different tire sizes. Since the interchangeable members which need to be kept in stock are relatively light and easily handled, and since these members require little space for storage, it will be apparent that but little space will be required for equipment capable of servicing all sizes of motor vehicle tires.

It is to be understood that variations and modifications of the specific device herein shown and described for purposes of illustration, may be made without departing from the spirit of the invention.

What I claim is:

1. Retread vulcanizing apparatus comprising an annular mold engageable with a retread on a tire casing, a series of angularly spaced supporting and positioning members, each engaging opposite edges of the mold and opposite sides of a tire casing within the mold, a cylindrical member fitting within the beads of the tire casing and supported independently of said casing, and an inflatable annulus that is expansible radially but substantially inexpansible laterally interposed between the cylinder and the tire tread for pressing said tread against the interior of the mold.

2. Retread vulcanizing apparatus comprising an annular mold engageable with a retread on a tire casing, means for supporting the mold, means associated with said supporting means engageable with the tire casing inwardly of the mold to hold the casing against axial movements with respect to the mold, a cylindrical inner member fitting within the central opening of the tire casing, said cylindrical member being supported independently of the tire casing and free from attachment to the casing, and an inflatable annular bag engaging the cylindrical member and the interior of the tread portion of the tire casing, said bag being expansible radially but substantially inexpansible laterally, so that when inflated it exerts a radial outward pressure on the tire tread but does not press against the side walls of the tire casing.

3. Retread vulcanizing apparatus comprising an annular tread engaging mold, a series of upright supports having means thereon for detachably clamping said mold in horizontal position, a cylindrical member of a size to fit within the beads of a tire casing, means independent of the tire casing for supporting said member concentrically with said mold, and a radially expansible inflatable annulus that is substantially inexpansible laterally and that is adapted to be interposed between said cylindrical member and the interior of the tread portion of the tire casing to press the retread radially outwardly against the interior of the mold.

4. Retread vulcanizing apparatus comprising a series of upright supports spaced angularly about a central point, an annular tread mold within said supports, means on each support for detachably clamping said mold and means carried by the mold clamping means of each support for clamping engagement with shoulder portions of a tire casing within the mold.

5. Retread vulcanizing apparatus comprising a series of upright supports spaced angularly about a central point, an annular tread mold within said supports, members on said supports engaging the bottom edge of said mold, members adjustably mounted on said supports for engagement with the top edge of the mold, and vertically adjustable clamping blocks carried by said members and engageable with shoulder portions of a tire casing inwardly of said mold.

6. Retread vulcanizing apparatus comprising a mold support having a series of uprights angularly spaced with respect to the center thereof and mounted for radial adjustment toward and away from said center, means for securing said uprights in adjusted positions, mold supporting and positioning members on the uprights providing ledges upon which the bottom edge of a tread mold may rest, positioning members above the supporting members adjustably mounted on the uprights and engageable with the top edges of a tread mold, and clamping blocks adjustably mounted on said supporting and positioning members and engageable with shoulder portions of a tire casing inwardly of the mold.

7. Retread vulcanizing apparatus comprising a mold support having a series of uprights angularly spaced with respect to the center thereof and mounted for radial adjustment toward and away from said center, means for securing said uprights in adjusted positions, mold supporting and positioning members on the uprights providing ledges upon which the bottom edge of a tread mold may rest, positioning members above the supporting members adjustably mounted on the uprights and engageable with the top edges of a tread mold, vertically disposed screws carried by each of said members, a clamping block swiveled to the upper ends of each lower screw and to the lower end of each upper screw, the upper and lower blocks having oppositely inclined faces engageable with shoulder portions of a tire casing inwardly of the tread mold.

8. Retread vulcanizing apparatus comprising a mold support having a central supporting portion and a series of uprights mounted for radial adjustment with respect to the central supporting portion, means carried by said uprights for detachably clamping a tread mold in horizontal position, means on said central supporting portion for detachably supporting a cylindrical member that fits within the beads of a tire casing in the mold to close the opening to the interior of said casing.

9. Retread vulcanizing apparatus comprising a mold support having a central pedestal with radially extending arms adjacent its upper end, members slidably mounted on said arms and having upright outer end portions, means for fastening said members in adjusted positions to said arms, and means carried by the upright ends of said members for supporting and positioning a retread mold.

10. Retread vulcanizing apparatus comprising a mold support having a central pedestal with radially extending arms adjacent its upper end, members slidably mounted on said arms and having upright outer end portions, means for fastening said members in adjusted positions to said arms, means carried by the upright ends of said members for supporting and positioning a retread mold, and means on said pedestal for detachably supporting a member for closing the opening of a tire casing.

11. Retread vulcanizing apparatus comprising an annular retread mold engageable with the tread portion only of a tire casing, means for supporting the mold in a horizontal position, a cylindrical member adapted to fit within the beads of a tire casing and close the tire casing opening, said cylindrical member having a valve stem receiving slot extending inwardly from one edge thereof, means independent of the tire casing for supporting said cylindrical member concentrically of the mold, means for closing said slot, and a radially expansible inflatable annulus that is substantially inexpansible laterally, and that is adapted to be interposed between said cylindrical member and the tread portion of the tire casing.

HERMAN T. KRAFT.

REFERENCES CITED

The following references are of record in the file of this patent:

UNITED STATES PATENTS

| Number | Name | Date |
|---|---|---|
| 1,620,435 | Burdette | Mar. 8, 1927 |
| 2,034,618 | Hawkinson | Mar. 17, 1936 |
| 2,147,339 | Glynn | Feb. 14, 1939 |
| 2,227,798 | Rihn et al. | Jan. 7, 1941 |
| 2,232,760 | Atkins | Feb. 25, 1941 |
| Re. 21,956 | Hawkinson | Nov. 25, 1941 |
| 2,370,972 | Kraft | Mar. 6, 1945 |
| 2,345,172 | Bacon | Mar. 28, 1944 |